United States Patent
Sahlholm et al.

(10) Patent No.: US 10,401,508 B2
(45) Date of Patent: Sep. 3, 2019

(54) SCINTILLATOR, SCINTILLATOR ASSEMBLY, X-RAY DETECTOR AND X-RAY IMAGING SYSTEM AND A METHOD FOR MANUFACTURING A SCINTILLATOR

(71) Applicant: SCINT-X AB, Kista (SE)

(72) Inventors: Anna Sahlholm, Huddinge (SE); Olof Svenonius, Stockholm (SE)

(73) Assignee: SCINT-X AB, Kista (SE)

( * ) Notice: Subject to any disclaimer, the term of this patent is extended or adjusted under 35 U.S.C. 154(b) by 0 days.

(21) Appl. No.: 16/065,414

(22) PCT Filed: Nov. 30, 2016

(86) PCT No.: PCT/SE2016/051191
§ 371 (c)(1),
(2) Date: Jun. 22, 2018

(87) PCT Pub. No.: WO2017/111681
PCT Pub. Date: Jun. 29, 2017

(65) Prior Publication Data
US 2019/0004187 A1  Jan. 3, 2019

Related U.S. Application Data (60) Provisional application No. 62/270,929, filed on Dec. 22, 2015.

(51) Int. Cl.
*G01T 1/20* (2006.01)
*G21K 4/00* (2006.01)
*G01T 1/202* (2006.01)

(52) U.S. Cl.
CPC ............ *G01T 1/2002* (2013.01); *G01T 1/202* (2013.01); *G01T 1/2023* (2013.01); *G21K 4/00* (2013.01)

(58) Field of Classification Search
CPC combination set(s) only.
See application file for complete search history.

(56) References Cited

U.S. PATENT DOCUMENTS

| 5,519,227 | A | 5/1996 | Karellas |
| 6,177,236 | B1 | 1/2001 | Apte |
| 6,344,649 | B2 | 2/2002 | Riedner et al. |

(Continued)

FOREIGN PATENT DOCUMENTS

| EP | 0 534 683 A2 | 3/1993 |
| WO | 2012/004703 A2 | 1/2012 |
| WO | 2014/109691 A1 | 7/2014 |

OTHER PUBLICATIONS

Olsen. U.L et al.: "Structured scintillator for X-ray imaging with micrometre resolution", Nuclear Instruments and Methods in Physics Research A, vol. 607, 2009, pp. 141-144, XP026320969.

(Continued)

*Primary Examiner* — Christine S. Kim
(74) *Attorney, Agent, or Firm* — Young & Thompson (57) ABSTRACT

Disclosed is a method for manufacturing a scintillator according to the proposed technology. The method includes providing a basic scintillator structure having micromechanical features, the basic scintillator structure having a front and a back. The method also includes applying a reflector on the front of the basic scintillator structure, and opening the back of the basic scintillator structure to create a scintillator having open ended micromechanical features.

9 Claims, 6 Drawing Sheets

(56) References Cited

U.S. PATENT DOCUMENTS

| | | | |
|---|---|---|---|
| 6,452,186 B1* | 9/2002 | Wieczorek | G01T 1/2002 250/214 VT |
| 6,744,052 B1 | 6/2004 | Petersson et al. | |
| 2009/0173885 A1* | 7/2009 | Zeitler | G01T 1/2002 250/370.11 |
| 2015/0060678 A1* | 3/2015 | Watano | G01T 1/2018 250/367 |

OTHER PUBLICATIONS

Sahlholm. A et al.: "Scintillator technology for enhanced resolution and contrast in X-ray imaging", Nuclear Instruments and Methods in Physics Research A, vol. 648, 2011, pp. 16-19, XP028244951.
Svenonius. O et al.: "Performance of an X-ray imaging detector based on a structured scintillator", Nuclear Instruments and Methods in Physics Research A, vol. 607, 2009, pp. 138-140, XP026320968.
International Search Report, dated Mar. 23, 2017, from corresponding PCT/SE2016/051191 application.

\* cited by examiner

SCINTILLATOR, SCINTILLATOR ASSEMBLY, X-RAY DETECTOR AND X-RAY IMAGING SYSTEM AND A METHOD FOR MANUFACTURING A SCINTILLATOR

TECHNICAL FIELD

The invention generally relates to x-ray imaging and an x-ray scintillator assembly, and more particularly to applications where a scintillator assembly and a pixelated image sensor are used in combination to capture an x-ray image.

BACKGROUND

It is common practice to use a scintillator in combination with an image sensor to capture x-ray images. In such a setup, the image sensor is placed behind the scintillator. However, by laws of nature, the scintillator can only absorb a certain fraction of all x-ray photons that enter the scintillator's surface. As a consequence, it is important for best detector performance and image quality to best utilize the information carried by each x-ray photon that is absorbed in the scintillator. In the scintillation process, the energy of an x-ray photon is transferred to a large number of secondary, visible, photons which can be detected by the image sensor. Because of noise generated in the image sensor, it is important to construct the scintillator so as to maximize the number of secondary photons that reach and can be detected by the image sensor. This will result in an x-ray detector with good signal-to-noise ratio.

It is a general requirement in x-ray imaging to achieve the best possible image quality, often interpreted as the balance between high resolution (sharpness) and high signal-to-noise ratio. These two image requirements are typically contradictory so that high resolution often is accompanied by reduced signal-to-noise ratio and vice versa.

Various techniques have been proposed for the fabrication of a structured scintillator, which is based on a micromechanical structure such as a structured array or matrix of pores or elongated trenches filled with scintillating material that would provide light guiding of secondary photons to an underlying imaging sensor. These techniques are all restricted in one or several aspects: either too large lateral dimensions (cutting, dicing), problems of forming a well-defined narrow wall (laser ablation), cross talk between adjacent pixels (columnar growth technique) or a lengthy processing time (valid for most of these techniques).

Deposition of a reflective coating in the bottom of the micromechanical structure such as pores has thus been suggested to improve light guiding and reduce cross talk, but designing and producing a feasible and efficient solution is generally not an easy task considering the manufacturing process, the narrow geometry of the micromechanical structure and materials involved.

U.S. Pat. No. 6,744,052 generally concerns the basic design of a structured scintillator, and also introduces a quite satisfactory solution for providing light guiding of secondary photons based on an embedded reflective coating in the scintillator.

U.S. Pat. No. 6,344,649 relates to a scintillator having a plurality of scintillator elements laid out in an array. The scintillator elements are fabricated from polycrystalline ceramic scintillator material or single crystal scintillation material. To increase the spatial resolution and the signal strength, the gaps between the scintillator elements are filled with a reflective material.

U.S. Pat. No. 6,177,236 relates to a pixelated scintillation layer in which high aspect ratio columns of scintillating material are formed. Wells may be formed in a body, and filled with scintillation material dispersed in a solvent/binder. A reflective coating may be deposited over the surface of the wells, e.g. by aluminum evaporation or electrochemical deposition.

U.S. Pat. No. 5,519,227 relates to a structured scintillation screen, where a pixelated structure having well-defined spatial geometries and depths is micro-machined using laser ablation. Following laser processing of the substrate, the 'pixels' are surrounded with an interstitial material having a refractive index lower than that of the substrate to allow each pixel to function as an individual optic waveguide.

EP 0,534,683 relates to a radiation imager comprising an array of scintillator elements optically coupled to a photodetector array. Interstitial wall members separate adjoining scintillator elements. A solution for reflection of light photons back into the scintillator elements is provided by means of a dual-layer reflective structure that comprises a primary dielectric layer of lower optical index to reflect light photons at the interface of the scintillator element and the dielectric layer, and a supplementary optically reflective layer to allow those light photons that strike the dielectric layer with an angle of incidence greater than the critical angle and enter the dielectric layer to reflect off of the supplementary optically reflective layer.

WO 2012/004703 relates to a scintillator having an array of so-called scintillator dixels that are separated by spacers. The spacers include a reflective material that facilitates directing light produced by a dixel to a corresponding light-sensing region of a photo-sensor array.

WO 2014/109691 relates to an x-ray scintillator comprising a pore matrix having a plurality of pores formed in a substrate. Each of the pores is at least partially covered with a multi-layered coating comprising at least a reflective layer and a protective layer. The at least partially coated pores are filled with scintillating material for absorbing x-ray photons to produce secondary photons, preferably with a wavelength in the visible range. The reflective layer of the multi-layered coating is arranged between the scintillating material and the substrate for reflecting the secondary photons, and the protective layer of the multi-layered coating is arranged between the reflective layer and the scintillating material for protecting the reflective layer while allowing reflection of the secondary photons by the reflective layer.

However, there is still a general demand for even more efficient solutions, especially for the purpose of increasing the signal-to-noise ratio without reducing the image resolution (sharpness).

SUMMARY

The present invention overcomes these and other drawbacks of the prior art.

It is a general object to enable x-ray imaging with improved image quality by improving the signal-to-noise ratio substantially without reducing the image resolution (sharpness).

It is an object to provide an improved scintillator or scintillator assembly, an x-ray detector comprising such an improved scintillator (assembly) and an x-ray imaging system comprising such an x-ray detector.

In particular it is desirable to construct a scintillator (assembly) in such a way that as many secondary photons as possible are generated in the scintillation process, and that the scintillator construction allows as many as possible of these secondary photons to reach the image sensor, thereby productively contributing to high signal-to-noise ratio and a high-qualitative image.

In a first aspect, a basic idea is to provide a novel method of manufacturing a scintillator assembly comprising a (embedded) reflector at the bottom of a micromechanical structure, comprising micromechanical features or elements such as pores or trenches, which serves to reflect secondary photons towards an associated image sensor.

According to a second aspect there is provided a method for manufacturing a scintillator. The method comprises the steps of:
 providing a basic scintillator structure having micromechanical features, the basic scintillator structure having a front and a back;
 applying a reflector on the front of the basic scintillator structure; and
 opening the back of the basic scintillator structure to create a scintillator having open ended micromechanical features.

According to a third aspect there is provided a scintillator according to the proposed technology. The scintillator comprises:
 a basic scintillator structure having micromechanical features, the basic scintillator structure having a front and a back; and
 a reflector arranged on the front of the basic scintillator structure, wherein the back of the basic scintillator structure is opened such that the back comprises open ended micromechanical features.

In this way, there is provided a front-reflector back-opened scintillator.

In another aspect, there is provided such a scintillator assembly comprising a (embedded) reflector at the bottom of the micromechanical structure, comprising micromechanical features or elements such as pores or trenches, which serves to reflect secondary photons towards an associated image sensor.

The reflector can be made up of one or multiple metal layers, or one or multiple dielectric layers, or a combination thereof.

In the case of a reflector made up of multiple dielectric layers, the layers are most commonly of quarter-wavelength thickness and different/alternating refractive indices, resulting in constructive interference, thereby high reflectivity, for the wavelength of the secondary photons.

The invention also provides an x-ray detector and/or x-ray imaging system based on such a novel scintillator assembly.

Basically, the invention offers the following advantages: The ability to capture x-ray images of high resolution and high signal-to-noise ratio.

The invention is particularly useful in the following technical applications: Medical, dental, industrial, scientific and security x-ray applications.

Other advantages of the invention will be appreciated when reading the below detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

The proposed technology relates to ways of embedding a reflector between a scintillator structure and a front support and open up the scintillator structure comprising micromechanical features or elements such as pores or trenches from the other (opposite) side of the basic scintillator structure/substrate (e.g. a silicon wafer), and more particularly to situations where the efficiency of the scintillator is of special interest.

By way of example, the basic scintillator structure can be regarded as a basic scintillator substrate having a micromechanical structure comprising micromechanical features. The micromechanical features such as pores or trenches are normally filled with scintillating material to provide a scintillator component.

Figure 2:
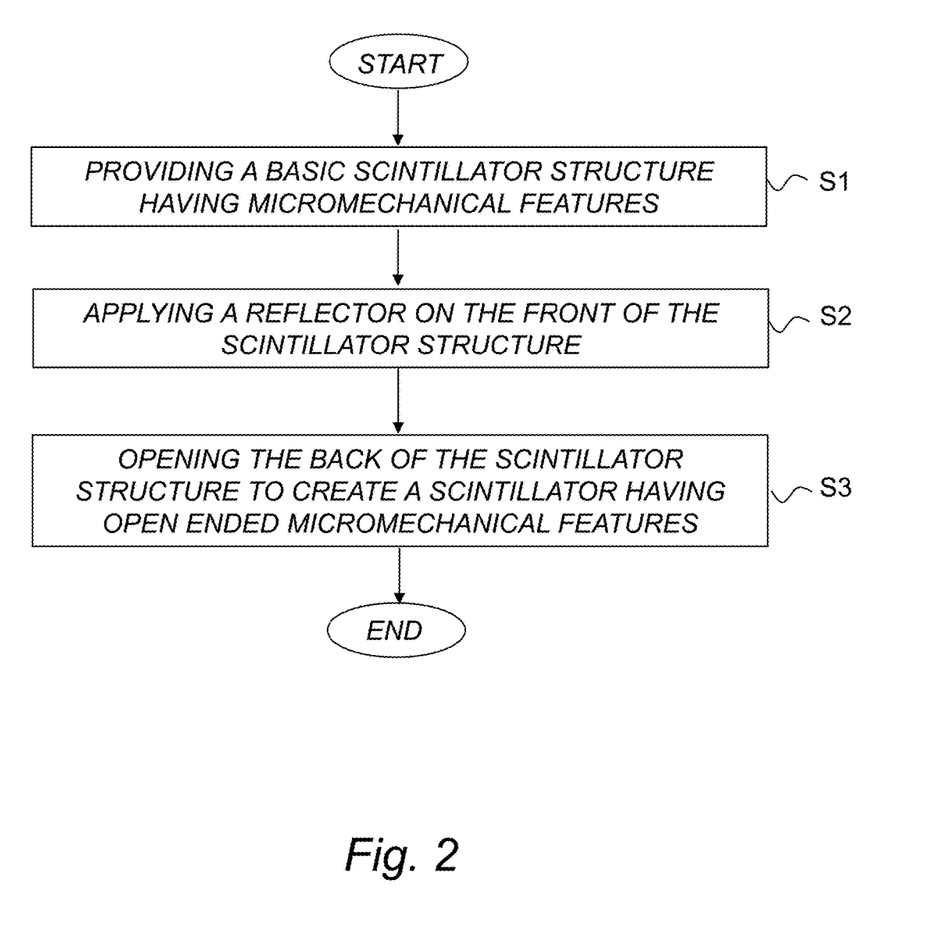
FIG. 2 is a flow diagram illustrating a method for manufacturing a scintillator according to the proposed technology.

FIG. 2 is a flow diagram illustrating a method for manufacturing a scintillator according to the proposed technology. The method comprises the steps of:
 providing (S1) a basic scintillator structure having micromechanical features, the basic scintillator structure having a front (top) and a back;
 applying (S2) a reflector on the front (top) of the basic scintillator structure;
 opening (S3) the back of the basic scintillator structure to create a scintillator having open ended micromechanical features.

Figure 3:
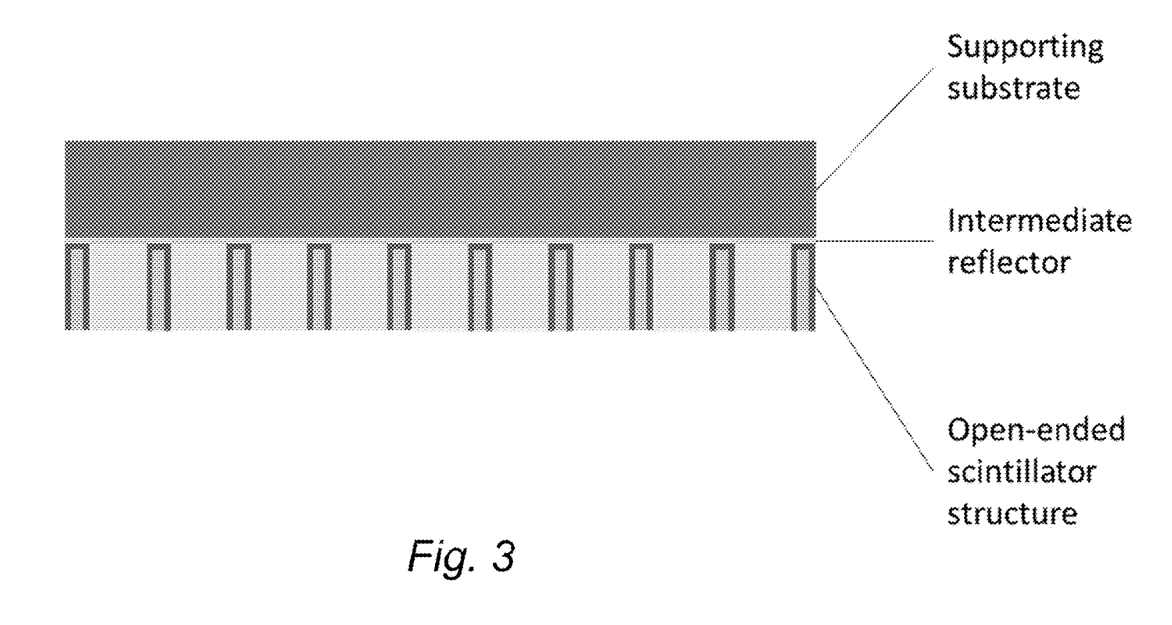
FIG. 3 is an exemplary diagram illustrating an example of constituent parts of the front reflector back opening scintillator assembly.
Figure 5:
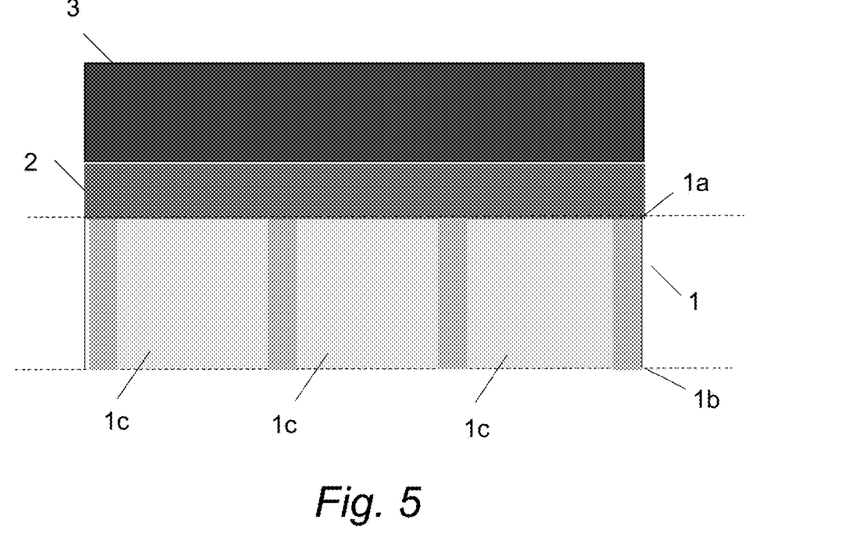
FIG. 5 is a schematic diagram illustrating an example of a scintillator according to the proposed technology.

FIG. 3 and FIG. 5 provide schematic illustrations of examples of a scintillator manufactured according to the proposed method, as will be described in more detail later on.

According to a particular embodiment of the proposed method, the micromechanical features 1c comprise a plurality of pores, or a plurality of elongated trenches.

In other words, a front reflector is applied on the front side of the basic scintillator structure where the openings of the micromechanical features are initially located to close the openings, and then the back side of the basic scintillator structure is opened to provide open-ended micromechanical features.

Optionally, the method may further comprise the step of mounting a front support 3 to the reflector 2.

By way of example, the step of mounting a front support 3 to the reflector 2 may be performed after the step S2 of applying the reflector 2 on the front 1a of the basic scintillator structure 1.

In a particular example, the step of mounting the front support 3 to the reflector 2 may even be performed after the step S3 of opening the back of the basic scintillator structure 1.

Alternatively, the step of mounting the front support 3 to the reflector 2 may be performed before the step S2 of applying the reflector 2 on the front 1a of the basic scintillator structure, corresponding to applying the reflector 2 on the front support 3 (or vice versa) and then attaching the front support 3 and reflector 2 to the basic scintillator structure 1.

In an optional embodiment of the proposed method the step S2 of applying a reflector 2 comprises adding one or multiple metal layers, or one or multiple dielectric layers, or a combination thereof, on top of the basic scintillator structure 1.

Another optional embodiment of the proposed technology provides a method wherein the step S2 of applying a reflector comprises depositing the reflector 2 on top of the basic scintillator structure 1.

According to a particular embodiment of the proposed method the step of mounting the front support on top of the reflector comprises attaching the front support to the reflector using glue.

Another particular embodiment of the proposed technology provides a method wherein the step S3 of opening the back of the basic scintillator structure 1 comprises performing mechanical grinding and/or plasma etching on the back 1b of the basic scintillator structure.

In other words, in order to open the micromechanical structure from the backside, a process based on mechanical grinding and/or plasma etching is used.

Yet another embodiment of the proposed technology provides a method wherein the step S1 of providing the basic scintillator structure 1 comprises providing a basic scintillator substrate having a micromechanical structure comprising micromechanical features. By way of example, the basic scintillator substrate may be provided in the form of a silicon wafer.

According to a particular version of the above embodiment there is provided a method wherein the step S1 of providing the basic scintillator structure further comprises adding reflective layers to the walls of the micromechanical features.

According to yet another version that there is provided an embodiment of the method wherein the step S1 of providing the basic scintillator structure 1 further comprises filling the micromechanical features with scintillating material.

Figure 4:
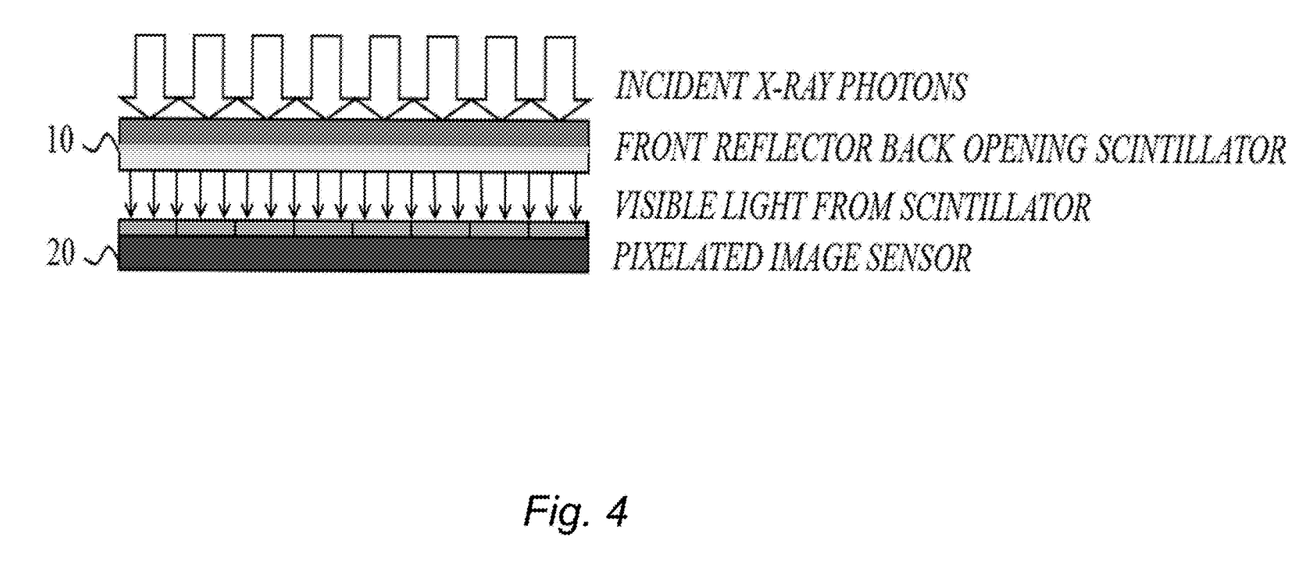
FIG. 4 is an exemplary diagram illustrating the front reflector back opening scintillator assembly together with a pixelated image sensor.

The resulting scintillator may be used to absorb x-ray photons and, for each such x-ray photon, emit a burst of photons, typically with a wavelength in the visible range, thus generating a light image that can be captured by a light-sensitive image sensor such as a charge-coupled device (CCD) or CMOS imaging sensor (CIS) as shown in FIG. 4. During such use the open end of the micromechanical features will be arranged towards the image sensor and the reflector will thus be located at the opposite side of the scintillator.

In other words, a basic idea is thus to attach a structured scintillator to a reflector and an optional stabilizing substrate, i.e. front support, and open up the (silicon) back side of the basic scintillator substrate to enable collection of a signal (light). Particular embodiments of the method basically involves applying a reflector i) either on the scintillator or ii) on the optional front support substrate, attaching the optional front support substrate, and opening up the basic scintillator substrate (silicon) from the back side using etching or grinding. Particular embodiments of the proposed method will be described below.

By way of example, the micromechanical features of the micromechanical structure may thus be etched in silicon (Si) with high precision, using commercially available silicon processing methods. The micromechanical scintillator structure, in particular the micromechanical features thereof, is typically filled with the scintillating material through a melting process. Subsequently, during the solidification phase, the scintillating material typically crystallizes inside the micromechanical features such as pores or trenches. In other words, in the completed scintillator, the filled micromechanical features typically include solidified melted scintillating material. Any suitable scintillating material can be used, such as Cesium Iodide, CsI, or Thallium doped CsI.

Figure 1:
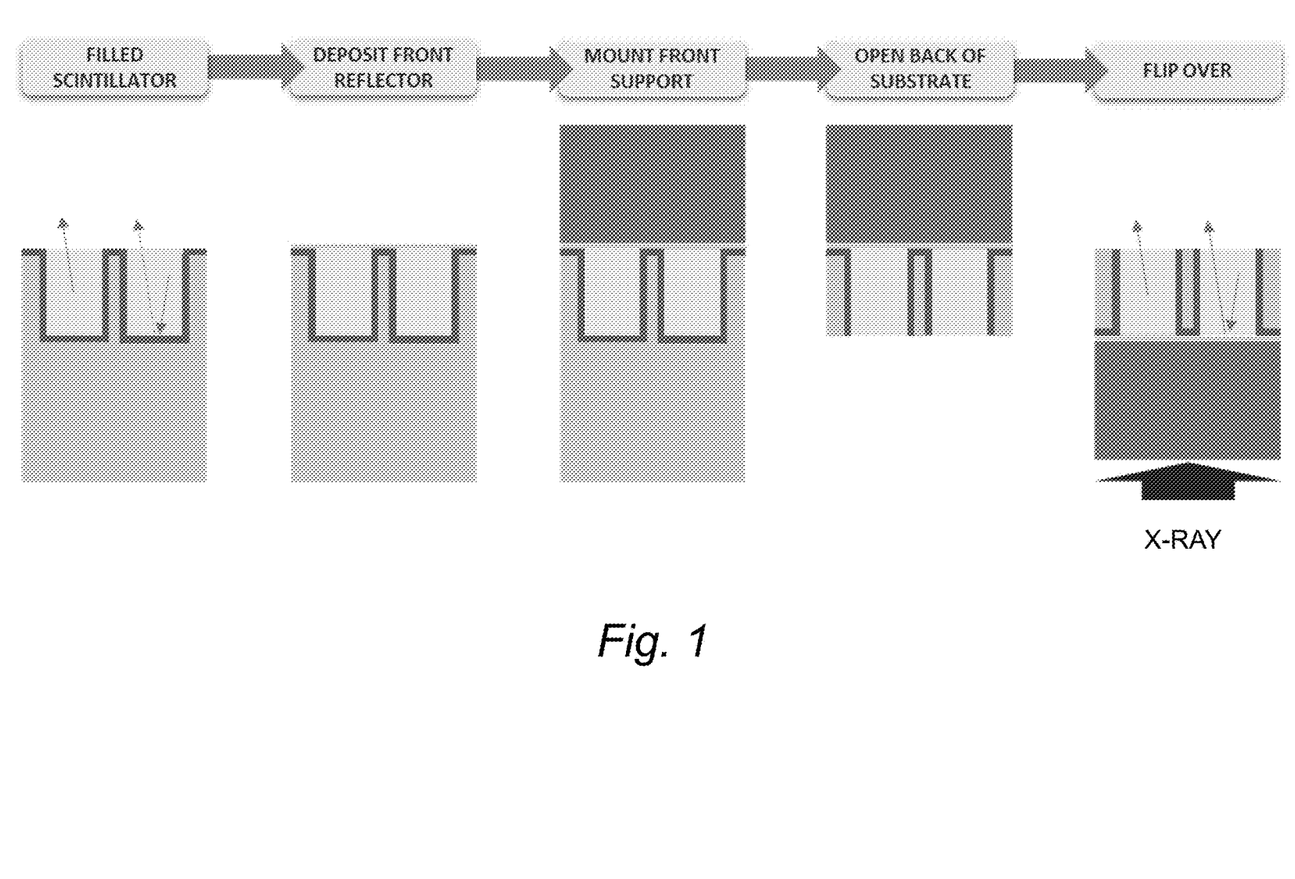
FIG. 1 is an exemplary flow diagram illustrating an example of a typical manufacturing process comprising a number of process steps.

In other words, FIG. 1 is an exemplary flow diagram illustrating an example of a typical process for adding a reflector to a structured scintillator and providing open-ended micromechanical features, comprising a number of process steps.

In this particular example the following process steps may be used:
1. Provide a structured scintillator, also referred to as a basic scintillator structure
2. Deposit a reflector on the front (top) of the scintillator structure
3. Optionally mount a front support to the reflector
4. Open the back of the basic scintillator structure to create a scintillator having open ended micromechanical features
5. Flip over the assembly The optional step 3 may alternatively be performed after step 4.

It is also possible to apply the reflector to the front support and then attach the combined front support and reflector to the basic scintillator structure.

The important aspect here is that the reflector, either by itself or as part of a combined front-reflector assembly, is applied to the basic scintillator structure. In other words, the reflector can be applied to the scintillator structure in one or more phases or steps.

At least some of the steps may be performed manually, or alternatively in an automated manner using suitably configured and controlled automation systems or assembly machines.

The manufacturing process described herein makes it possible to provide a so-called "bottom" reflector even for micromechanical features such as pores having a large depth-to-width ratio, where other methods have failed to provide a reflecting surface all the way to the bottom of the micromechanical structure.

With this manufacturing process, the reflector does not have to withstand high temperatures since the reflector is not present in the melting process where the scintillator micromechanical structure is filled with scintillating material.

Preferably, the front support substrate (through which the incoming x-rays should pass) can be made of a material that does not substantially absorb x-rays.

The proposed technology also provides for a scintillator. The scintillator may be manufactured according to the earlier described method.

FIG. 3 and FIG. 5 illustrate examples of a scintillator according to the proposed technology.

FIG. 3 shows the resulting scintillator assembly comprising a supporting substrate, an intermediate reflector, and an open-ended scintillator structure.

FIG. 5 is a schematic diagram illustrating another example of a scintillator according to the proposed technology.

The scintillator comprises a basic scintillator structure 1 having micromechanical features 1c, the basic scintillator structure 1 having a front 1a and a back 1b. The scintillator also comprises a reflector 2 arranged on the front 1a of the basic scintillator structure 1, and the back (1b) of the basic scintillator structure (1) is opened such that the back (1b) comprises open ended micromechanical features.

Optionally, the scintillator also comprises a front support 3 arranged on the reflector 2.

In this way, there is provided a front-reflector back-opened scintillator.

In other words, the basic scintillator structure 1 is open/opened on both sides, where a reflector is provided on the front side and the back side exhibits open ended micromechanical features.

A particular embodiment of the proposed technology provides a scintillator wherein the micromechanical features comprise a plurality of pores, or a plurality of elongated trenches.

Another particular embodiment provides a scintillator wherein the open ended micromechanical features comprise walls having reflective layers.

By way of example, the walls should be able to reflect secondary photons towards an associated image sensor. This can for example be obtained by adding a metal, oxide or multiple layers of metal(s) and/or oxide(s) to the walls before filling the silicon matrix with scintillating material.

Yet another embodiment of the proposed technology provides a scintillator wherein the micromechanical features are filled with scintillating material.

By way of example, the scintillating material comprises Cesium Iodide, CsI, or Thallium doped CsI.

For example, the basic structure of the initial form of the structured scintillator is defined by a micromechanical structure comprising micromechanical features such as a plurality of pores, or a plurality of elongated trenches, formed in a substrate, referred to as the basic scintillator substrate, wherein the micromechanical features are filled with scintillating material. As an example, the substrate may be a silicon wafer.

In other words, the basic scintillator structure preferably comprises a basic scintillator substrate having a micromechanical structure comprising micromechanical features.

By way of example, the micromechanical features of the micromechanical scintillator structure may be etched in silicon (Si) with high precision, using commercially available silicon processing methods. The micromechanical structure (in particular the micromechanical features thereof) is typically filled with the scintillating material through a melting process. Subsequently, during the solidification phase, the scintillating material typically crystallizes inside the micromechanical features of the scintillator structure. In other words, in the completed scintillator, the filled micromechanical features typically include solidified melted scintillating material. Any suitable scintillating material can be used, such as Cesium Iodide, CsI, or Thallium doped CsI.

According to an optional embodiment of the proposed scintillator the reflector comprises one or multiple metal layers, or one or multiple dielectric layers, or a combination thereof.

The reflector can thus be made up of one or multiple metal layers, or one or multiple dielectric layers, or a combination thereof, and can be adhered either to the top of the scintillator or to the substrate. In case the reflector is chosen from a material sensitive to the scintillating material, one or multiple protective layers might be added to the top of the scintillator before adding the reflector. The protective layers should be thin, e.g. 50 nm-10 µm in total, optically transparent, and chemically inert to the scintillating material.

According to another optional embodiment of the proposed scintillator the reflector comprises a substrate made of carbon based composites or polymers or aluminum.

The substrate used as mechanical/stabilizing support, also referred to as the front support, is, according to particular embodiment of the proposed technology, preferably chosen so that it gives both good mechanical stability and low x-ray absorption. Examples of materials are carbon based composites, polymers and Aluminum. For example, the front support substrate can be attached using a glue with good adhesive properties and that can withstand the process steps following after.

The scintillator assembly, when ready for use, is designed for absorbing x-ray photons and, for each such x-ray photon, emitting a burst of photons, typically with a wavelength in the visible range, thus generating a light image that can be captured by a light-sensitive image sensor such as a charge-coupled device (CCD) or CMOS imaging sensor (CIS) as shown in FIG. 4. Typically, the "open end" is arranged towards the image sensor and the "bottom" reflector is thus located at the opposite side. The reflector and the reflective walls of the micromechanical features or elements of the micromechanical structure aid in guiding the light emitted in the scintillator towards the image sensor.

The proposed technology also provides a scintillator assembly comprising a scintillator 1 according to the above described.

The proposed technology also provides an x-ray detector comprising a scintillator assembly according to what is described herein.

Figure 6:
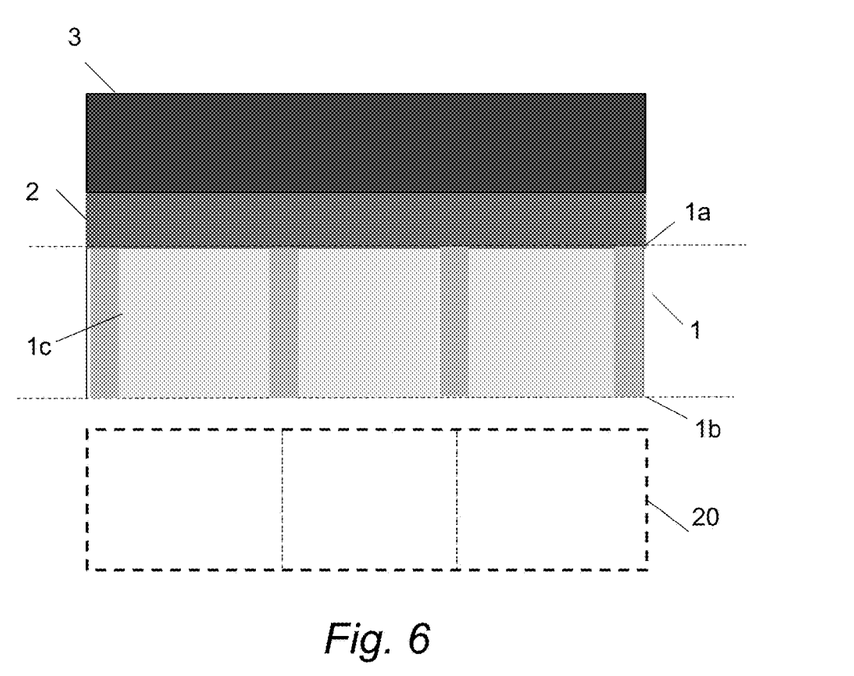
FIG. 6 is a schematic diagram illustrating a simplified example of an x-ray detector according to the proposed technology wherein the scintillator assembly is combined with an image sensor.

FIG. 6 is a schematic diagram illustrating a simplified example of an x-ray detector according to the proposed technology wherein the scintillator assembly is combined with an image sensor. For example, the schematically illustrated image sensor 20 may be a pixelated image sensor 20 arranged adjacent to the open ended micromechanical features 1c.

The proposed technology further provides an x-ray imaging system comprising such an x-ray detector.

Figure 7:
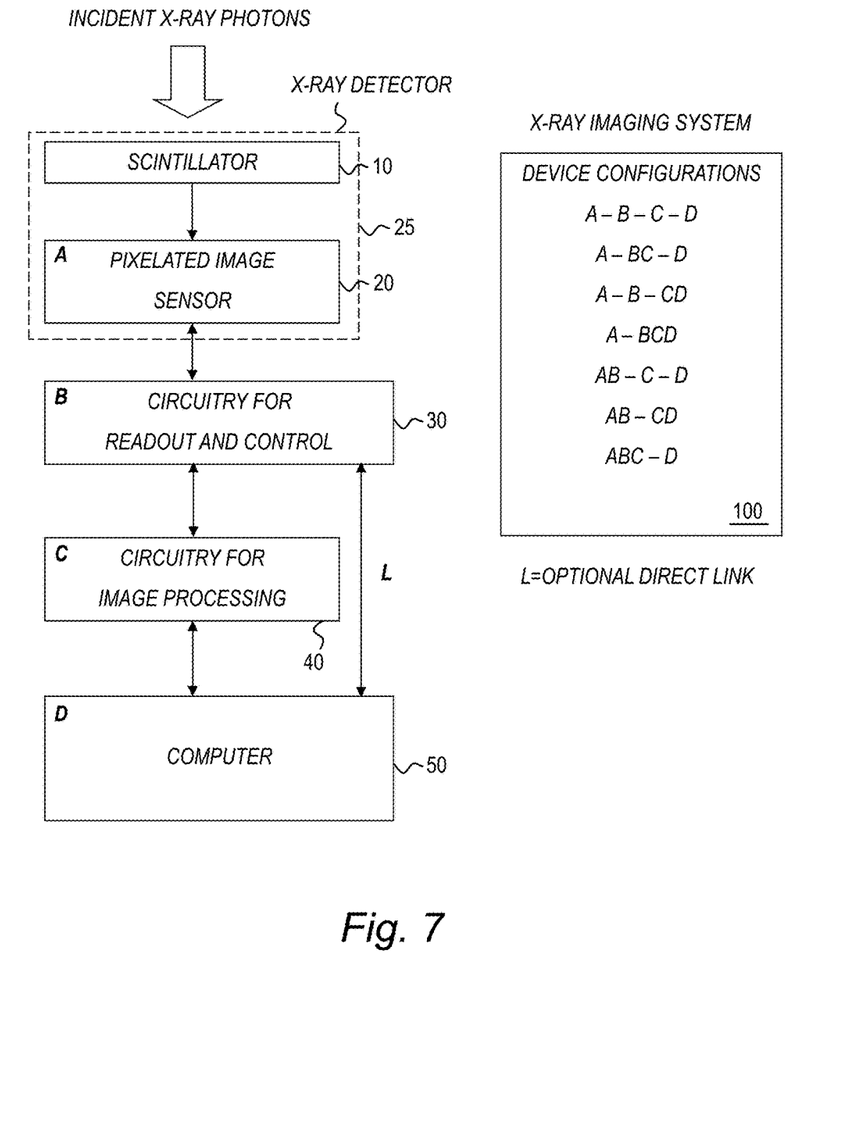
FIG. 7 is a schematic block diagram illustrating an example of possible configurations of an x-ray imaging system.

FIG. 7 is an exemplary block diagram of typical setups of an x-ray imaging device or system, including a scintillator 10, an image sensor 20 (A), circuitry 30 for readout and control (B), circuitry 40 for image processing (C) and a computer 50 (D). Possible device configurations are shown to the right, where hyphen ("-") denotes separation between devices. As indicated there exist a wide variety of different possible device configurations.

The scintillator 10 is configured for absorbing x-ray photons and emitting photons with a wavelength in the visible range to thus generate a light image. The image sensor 20 is arranged in combination with the scintillator 10 and configured for capturing the light image.

The scintillator 10 is constructed as described above. The image sensor 20 is preferably a pixelated image sensor having a number of pixels. If possible from a cost-effective perspective, the pores of the scintillator 10 may for example be aligned with one or more of the pixels of the image sensor for optimized detector performance. It is not necessary to have an ideal one-to-one mapping between the pores and the pixels. For example, the pores and the pixels may have different geometries in cross-section.

It should also be understood that circuitry 20 and 30 (A and B) may be integrated. Alternatively, circuitry 30 and 40 (B and C) may be integrated, or all of circuitry 20, 30 and 40 (A, B and C) may be integrated. It is also possible to integrate circuitry 30 and/or 40 (B and/or C) in the computer 50 (D). The direct link "L" between circuitry 30 (B) and circuitry 50 (D) is optional. In FIG. 4, bi-directional arrows indicate bi- or unidirectional communication.

By way of example, the scintillator 10 and the image sensor 20 define an x-ray detector.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A method for manufacturing a scintillator, the method comprises the steps of:
   providing a basic scintillator structure having micromechanical features, said basic scintillator structure having a front and a back;
   applying a reflector on the front of the basic scintillator structure; and
   opening the back of said basic scintillator structure to create a scintillator having open ended micromechanical features;
   wherein the method comprises mounting a front support to the reflector;
   wherein the step of mounting a front support to the reflector is performed after the step of applying the reflector on the front of the basic scintillator structure; and
   wherein the step of mounting a front support to the reflector is performed after the step of opening the back of the basic scintillator structure.

2. The method according to claim 1, wherein said micromechanical features comprise a plurality of pores, or a plurality of elongated trenches.

3. The method according to claim 1, wherein the step of applying a reflector comprises adding one or multiple metal layers, or one or multiple dielectric layers, or a combination thereof, on top of said basic scintillator structure.

4. The method of claim 1, wherein the step of applying a reflector comprises depositing said reflector on top of the basic scintillator structure.

5. The method according to claim 1, wherein the step of opening the back of said basic scintillator structure comprises performing mechanical grinding and/or plasma etching on said back of said basic scintillator structure.

6. The method according to claim 1, wherein the step of providing a basic scintillator structure comprises providing a basic scintillator substrate having a micromechanical structure comprising said micromechanical features.

7. The method according to claim 1, wherein the step of providing a basic scintillator structure further comprises adding reflective layers to the walls of said micromechanical features.

8. The method according to claim 1, wherein the step of providing a basic scintillator structure further comprises filling said micromechanical features with scintillating material.

9. A method for manufacturing a scintillator, the method comprises the steps of:
   providing a basic scintillator structure having micromechanical features, said basic scintillator structure having a front and a back;
   applying a reflector on the front of the basic scintillator structure; and
   opening the back of said basic scintillator structure to create a scintillator having open ended micromechanical features;
   wherein the method comprises mounting a front support to the reflector; and
   wherein the step of mounting a front support to the reflector is performed before the step of applying the reflector on the front of the basic scintillator structure, corresponding to applying the reflector on the front support and then attaching the front support and reflector to the basic scintillator structure.

* * * * *